United States Patent [19]

Rhodes

[11] Patent Number: 4,592,399
[45] Date of Patent: Jun. 3, 1986

[54] ROTARY CUTTER ASSEMBLY

[76] Inventor: William J. Rhodes, 3347 Camp Ground Rd., Louisville, Ky. 40211

[21] Appl. No.: 661,778

[22] Filed: Oct. 17, 1984

[51] Int. Cl.$^4$ .............................................. B27G 13/00
[52] U.S. Cl. ................................ 144/229; 144/114 R; 144/230; 407/38; 408/184; 408/185
[58] Field of Search ............... 408/181, 182, 184, 185; 407/37, 38, 39; 144/134 R, 134 A, 114 R, 117 R, 118, 229, 230, 237, 231

[56] References Cited

U.S. PATENT DOCUMENTS

| 2,043,689 | 6/1936 | Zempel | 408/185 |
| 3,946,777 | 3/1976 | Heimbrand | 144/237 |

FOREIGN PATENT DOCUMENTS 2000185 7/1971 Fed. Rep. of Germany ...... 408/185

Primary Examiner—W. D. Bray
Attorney, Agent, or Firm—Charles G. Lamb

[57] ABSTRACT

A rotary cutter assembly for cutting or milling the edge of a workpiece which is formed of layers of different materials. The rotary cutter assembly comprises a first cutter head and a separate second cutter head disposed in mutual coaxial relationship. The rotary cutter assembly is adapted for rotation about the mutual coaxial axis. The first cutter head includes at least one cutter blade pocket open to the perimeter of the first cutter head, a cutter blade received within the cutter blade pocket with its cutting edge protruding from the pocket opening beyond the perimeter of the first cutter head, and an adjustment device for adjusting the distance by which the cutting edge of the cutter blade protrudes beyond the perimeter of the cutter head. The second cutter head includes at least one cutting edge formed in the perimeter of the second cutter head.

12 Claims, 5 Drawing Figures

ROTARY CUTTER ASSEMBLY

BACKGROUND

1. Field of the Invention

The present invention relates to cutting or milling tools, and more particularly, to an edge cutting or milling tool for edge cutting a laminated work piece having layers of different materials.

2. Description of the Prior Art

Various edge cutting or milling tools are known. Examples of known edge cutting and milling tools are disclosed in a number of U.S. patents.

U.S. Pat. No. 2,814,320 is directed to a cutter assembly having a circular cutter head including a plurality of cutting knives spaced apart around the perimeter of the cutter head. The cutting knives fit into pockets in the periphery of the cutter head and are held in position by means of wedge shaped blocks which fit into the pockets forcing the cutting blade against one wall of the pocket.

U.S. Pat. No. 3,039,503 is directed to a cutter apparatus having a cutter head including a plurality of cutting blades spaced apart around the perimeter of the cutter head. The cutting blades fit into pockets formed in the periphery of the cutter head. Each cutting blade includes an adjustable stop screw which is threaded into the back side of the cutting blade and abuts the back wall of the pocket. In order to adjust the distance by which the cutting blade projects from the perimeter of the cutter head, the cutting blade is removed from its pocket in the cutter head and placed in a measuring jig. The stop screw is then threaded into or out of the back side of the cutting blade a desired amount as measured by the jig corresponding to the distance by which the cutting blade is to project from the perimeter of the cutter head. The cutting blade is then repositioned in its pocket in the cutter head and fastened in place by a wedge shaped block which also fits into the pocket forcing the cutting blade against one wall of the pocket.

U.S. Pat. No. 3,941,173 and U.S. Pat. No. 3,946,777 are directed to apparatuses for machining the edge of a laminated panel. Each apparatus includes two cutting tools mounted on a common driving shaft. As one of the two cutting tools wears faster than the other, the worn tool is moved axially of the driving shaft to a new position of the cutting edge of the tool into a new cutting position relative to the laminated panel.

SUMMARY OF THE INVENTION

An object of the present invention is to provide a rotary cutting assembly particularly suited for cutting the edge of a laminated workpiece having laminae of different hardnesses.

Another object of the present invention is to provide a rotary cutting assembly in which the cutter tool used to cut the harder laminae includes cutting blades which are adjustable in a generally radial direction of the cutter tool to compensate for cutting blade wear.

A further object of the present invention is to provide a rotary cutting assembly wherein the position of the cutting blades of the cutting tool used to edge cut the harder laminae are radially adjustable without removing the cutting blades from the cutter tools.

More particularly, the present invention provides a rotary cutting assembly comprising a first rotary cutter head, at least one cutting tool associated with the first rotary cutter head at the perimeter thereof, and adjustment means interconnecting the at least one cutting tool and the first rotary cutting head for adjusting the distance by which the at least one cutting tool projects beyond the perimeter of the first cutter head without removing the at least one cutting tool from the first rotary cutter head.

BRIEF DESCRIPTION OF THE DRAWINGS

The features and advantages of the present invention will become even more clear upon reading the following disclosure in conjunction with the accompanying drawings in which the numerals refer to like components throughout the several views and wherein.

DETAILED DESCRIPTION OF THE PREFERRED EMBODIMENT

Figure 1:
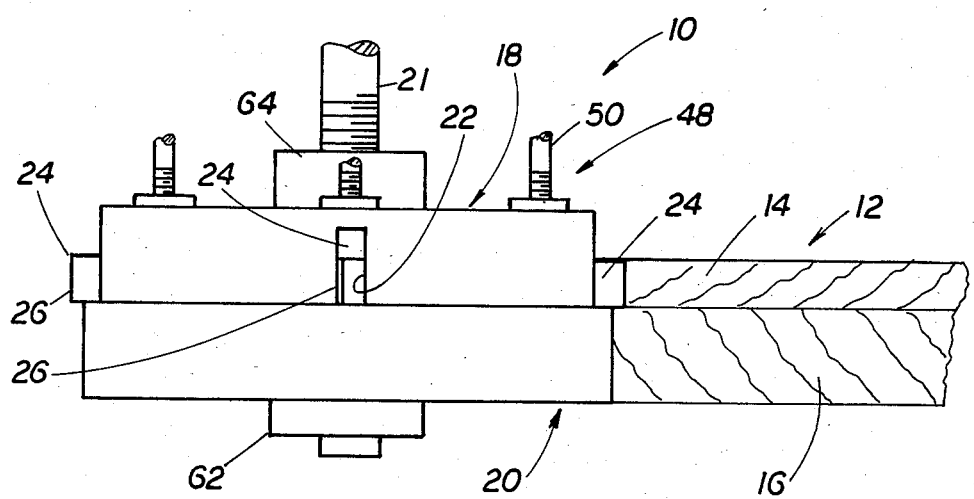
FIG. 1 is a side view of the rotary cutting assembly of the present invention.

With reference to FIG. 1, there is shown a rotary cutting assembly, generally denoted as the numeral 10, of the present invention. The rotary cutting assembly is particularly well adapted for edge cutting or milling a work piece such as a laminated panel 12 fabricated of two or more laminae, for example laminae 14 and 16, each of a different hardness. The rotary cutting assembly 10 includes a first rotary cutter head 18 which is used to edge cut or mill the harder laminae 14 and a second rotary cutter head 20 which is used to edge cut or mill the other, or softer, laminae 16. The first cutter head 18 and second cutter head 20 are in a rotatable coaxially alignment. The first cutter head 18 and the second cutter head 20 are mounted to a common driving spindle 21 of a cutting or milling machine (not shown) and well known in the art.

Figure 2:
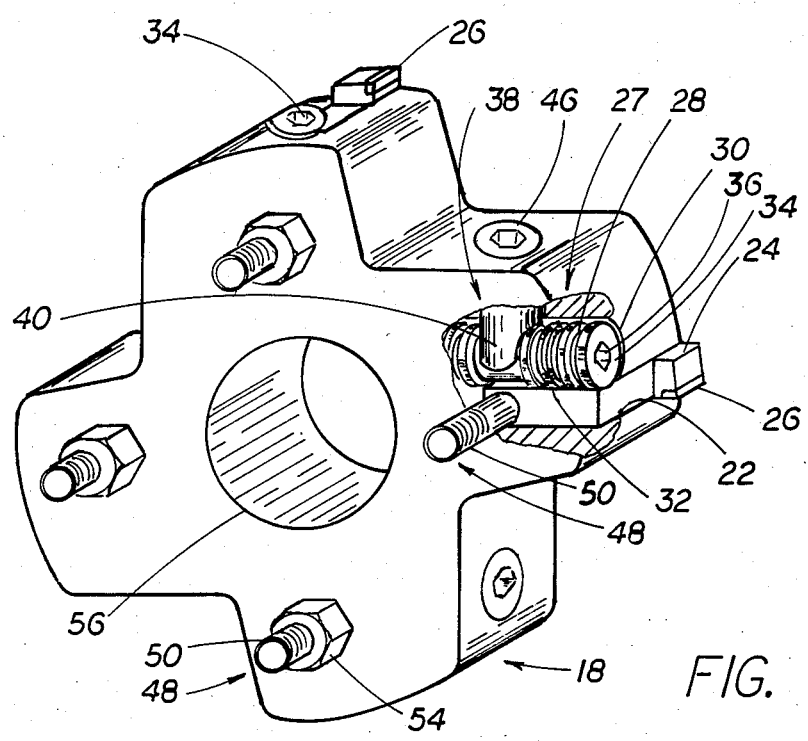
FIG. 2 is a perspective view of a first cutter head of the present invention shown in FIG. 1 partially broken away to show details.
Figure 4:
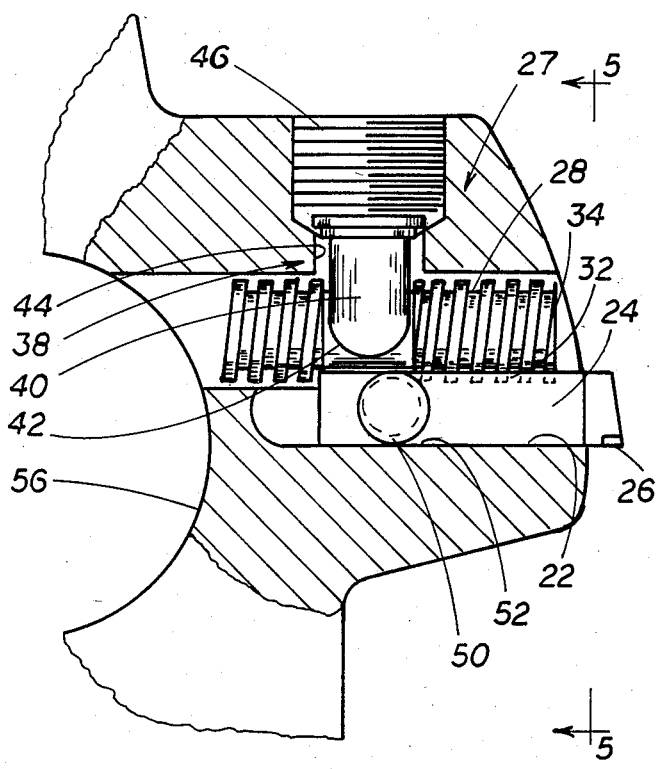
FIG. 4 is a top sectioned view of a portion of FIG. 2.
Figure 5:
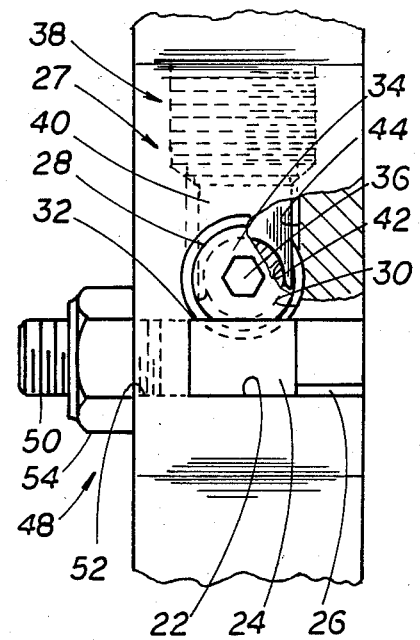
FIG. 5 is a side view of a portion of the first cutter head, partially broken away to show detail, as viewed in the direction of arrows 5—5 in FIG. 4.

With reference to FIGS. 2, 4 and 5, the first rotary cutter head 18 includes at least one cutter tool receiving pocket 22 formed therein and open to the perimeter of the first cutter head 18. As shown, the first cutter head 18 is formed with four identical cutter tool receiving pockets 22 equally spaced about the perimeter of the first cutter head 18. The number of cutter tool receiving pockets 22 will be a function of the angular velocity of the first cutter head 18, the hardness or brittleness of the material of the laminae 14 to be cut, and the smoothness or coarseness of the cut to be made. A separate cutter tool 24 is received in each cutter tool receiving pocket 22 such that the cutting edge 26 of each cutter tool 24 protrudes from the opening of the cutter tool receiving pocket 22 beyond the perimeter of the first cutter head 18.

The first cutter head 18 further includes adjustment means, generally denoted as the numeral 27, which is associated with both the first cutter head 18 and each of the cutter tools 24 in each pocket 22. Thus, each cutter tool 24 is independently adjustable. The adjustment means 27 includes a worm gear 28 located in a channel 30 which is located next to and is open to the cutter tool receiving pocket 22. The side of the cutter tool 24 located in a cutter tool receiving pocket 22 at the opening thereof communicating with the worm gear channel 30 is formed with a gear teeth configuration 32 which engages the worm gear 28. One end 34 of the worm gear 28 is located at and exposed to the perimeter of the first cutter head 18. The exposed end 34 of the worm gear 28 includes a worm gear rotating means such as, for example an adjustment tool receiving socket 36 for receiving an adjustment tool (not shown) to enable the worm gear 28 to be rotated about its longitudinal axis in the channel 30.

As the worm gear 28 is rotated, the interaction of the worm gear and the gear teeth 32 of the cutter tool 24 causes the cutter tool 24 to traverse in its pocket 22. Thus, the amount by which the cutting edge 26 of the cutter tool 24 protrudes from the opening of the cutter tool receiving pocket 22 beyond the perimeter of the first cutter head 18 can be selectively changed.

The worm gear 28 is held in place within its channel 30 and in operative engagement with the gear teeth configuration 32 of cutter tool 24 by a retaining device 38. The retaining device 38 is illustrated as a cylindrically shaped shackle 40 formed with a U-shaped end 42 which receives a portion of the periphery of the worm gear 28. The shackle 40 is longitudinally received in a bore 44 formed in the first cutter head 18 generally perpendicular to the longitudinal axis of the worm gear receiving channel 30. The U-shaped end 42 of the shackle 40 is held against the periphery of the worm gear 28 by a threaded plug 46 received in the exposed end of the bore 44.

The cutter tool 24 is secured in place against inadvertent movement with the cutting edge 26 protruding a preselected distance beyond the perimeter of the first cutter head 18 by securing means, generally denoted as the numeral 48. The securing means 48 is shown as including a threaded shank 50 which is attached to the top side of the cutter tool 24 and projects to the outside of the first cutter head 18 through an elongated slot 52 formed in the top side of the first cutter head 18 open to the cutter tool receiving pocket 22. A threaded fastener, such as a machine nut 54, is threaded on the shank 50 and tightened down against the top side of the first cutter head 18, thus, securing the cutter tool 24 in position.

The first cutter head 18 further includes a central bore 56 for receiving therethrough the driving spindle 21 of the cutting or milling machine.

Figure 3:
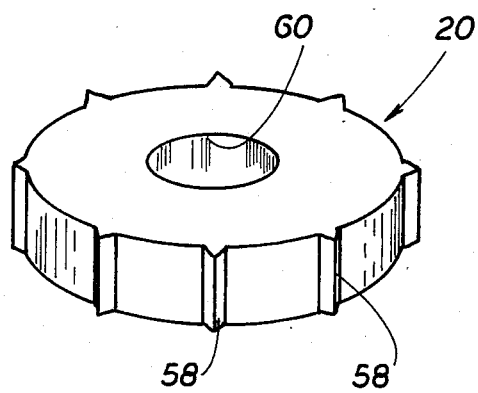
FIG. 3 is a perspective view of a second cutter head of the present invention shown in FIG. 1.

With reference to FIGS. 1 and 3, the second rotary cutting head 20 is shown as including at least one cutting edge 58 formed in the perimeter of the second cutting head 20. As shown, the second cutting head 20 is formed with a plurality of cutting edges 58 equally spaced apart around the perimeter of the second cutting head 20. The second cutting head 20 is also formed with a central bore 60 for receiving therethrough the driving spindle 21 of the cutting or milling machine.

As shown in FIG. 1, the first rotary cutting head 18 and second rotary cutting head 20 are rotatably coaxially mounted on the spindle 21. And, virtually any conventional means can be used to fasten the cutting heads 18 and 20 to the spindle 21 for rotation therewith. For example, as illustrated, the free end of the spindle 21 is formed with a head 62 against which the second cutter head 20 abuts, and a nut 64 which abuts the first cutter head 18. Thus, the cutter heads 18 and 20 are held on the spindle 21 between the spindle head 62 and nut 64 for rotation with the spindle 21.

The cutter tools 24 of the first cutter head 18 and cutting edges 58 of the second cutter head 20 can be fabricated of virtually any material. However, because of cutting tools 24, the first cutter head 18 will be used to edge cut a harder material, such as a laminated plastic, than will the cutting edges 58 of the second cutter head 20, the cutting tools 24 are preferably fabricated of a harder material than the material of the cutting edges 58. For example, it has been found practical to fabricate at least the cutting edge 26 of the cutting tools 24 of a diamond containing material, and form the cutting edges 58 of a carbide having an appropriate hardness.

In operation, as the cutting tools 24 wear, they are moved by the adjusting means to compensate for the wear without having to remove them from the first cutter head 18, and without having to remove the first cutter head 18 from the spindle 21.

The foregoing detailed description is given primarily for clearness of understanding and no unnecessary limitations are to be understood therefrom for modifications will become obvious to those skilled in the art upon reading this disclosure and may be made without departing from spirit of the invention or scope of the appended claims.

What is claimed:

1. A rotary cutting assembly comprising:
   at least a first rotary cutter head;
   at least one cutting tool associated with the cutter head at the perimeter thereof;
   adjustment means interconnecting the at least one cutting tool and the first rotary cutting head for adjusting the distance by which the at least one cutting tool projects beyond the perimeter of the first cutter head without removing the at least one cutting tool from the first rotary cutter head; and
   means for securing the at least one cutting tool against inadvertent movement with the cutting edge protruding a preselected distance beyond the perimeter of the first cutter head.

2. The rotary cutting assembly of claim 1, further comprising:
   means defining at least one cutter blade receiving pocket formed in the first cutter head and being open to the perimeter of the first cutter head;
   the at least one cutting tool being received within the cutting tool receiving pocket with the cutting edge thereof projecting from the opening of the cutter blade receiving pocket beyond the perimeter of the first cutter head; and
   the adjustment means being located within the first rotary cutter head and structurally associated with the portion of the cutting tool located within the cutter tool receiving pocket.

3. The rotary cutting assembly of claim 2, wherein the adjustment means comprises:
   a worm gear located next to the at least one cutter tool receiving pocket;
   gear teeth formed in the at least one cutting tool engaging the worm gear; and,
   so that rotation of the worm gear about its longitudinal axis causes the at least one cutter to traverse in the cutter tool receiving pocket thus changing the distance by which the cutting edge of the cutting tool projects beyond the perimeter of the first cutter head.

4. The rotary cutting assembly of claim 3, wherein the first cutter head comprises means defining a worm gear receiving channel located next to and open to the at least one cutting tool receiving pocket in which the worm gear is located.

5. The rotary cutting assembly of claim 4, further comprising means for holding the worm gear within the worm gear receiving channel and in operative engagement with the gear teeth formed in the at least one cutting tool.

6. The rotary cutting assembly of claim 5, wherein the worm gear holding means comprises a shackle formed with a generally U-shaped end which receives a portion of the periphery of the worm gear.

7. The rotary cutting assembly of claim 3, wherein the worm gear rotating means is located at and exposed to the perimeter of the first cutter head.

8. The rotary cutting assembly of claim 7, wherein the worm gear rotating means comprises an adjustment tool receiving socket.

9. The rotary cutting assembly of claim 1, wherein the cutting tool securing means comprises:
- a threaded shank attached to the cutting tool projecting from the cutting tool to the outside of the first cutter head; and,
- a threaded fastener threaded on the threaded shank from the outside of the first cutter head.

10. The rotary cutting assembly of claim 1, comprising a plurality of cutting tools equally spaced apart about the perimeter of the first cutter head.

11. The rotary cutting assembly of claim 1, further comprising:
- a second separate rotary cutter head coaxially mounted onto a rotatable shaft with the first rotary cutter head.

12. The rotary cutting assembly of claim 11, wherein:
the second rotary cutter head includes cutting edges; and,
the cutting edges of the cutting tools associated with the first rotary cutter head are of a harder material than that of the cutting edges of the second rotary cutter head.

* * * * *